F. F. THEDENS.
Portable Fly-Trap.
No. 198,255.       Patented Dec. 18, 1877
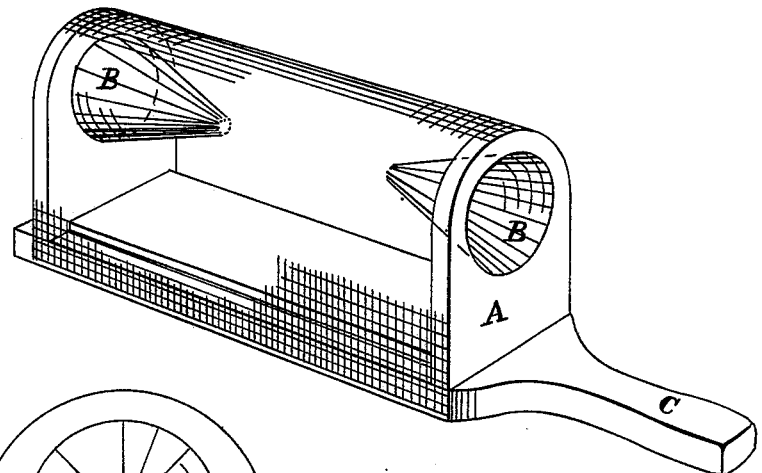
Fig. 1.
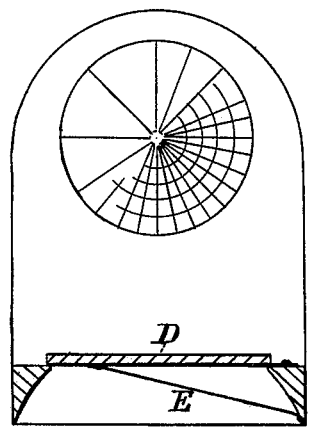
Fig. 2.
Fig. 3.
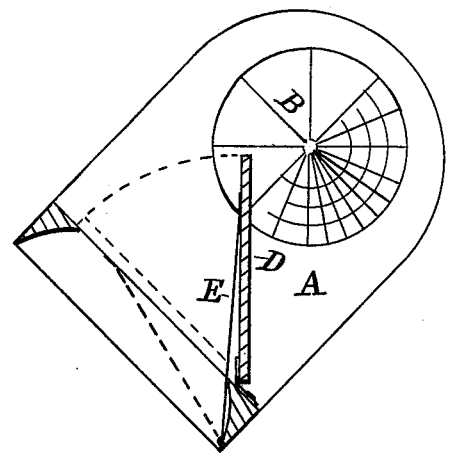
Witnesses:
John P. Lothrop
P. B. Turpin.
Inventor:
Ferdinand F. Thedens
by Jn Burris
Attorney.

UNITED STATES PATENT OFFICE.

FERDINAND F. THEDENS, OF LYONS, IOWA.

IMPROVEMENT IN PORTABLE FLY-TRAPS.

Specification forming part of Letters Patent No. 198,255, dated December 18, 1877; application filed October 4, 1877.

*To all whom it may concern:*

Be it known that I, FERDINAND FRIDRICH THEDENS, of Lyons city, in the county of Clinton and State of Iowa, have invented certain new and useful Improvements in Fly-Traps; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 is a perspective view. Fig. 2 is a transverse section. Fig. 3 is a transverse section, illustrating the position of the trap when in operation.

My invention consists of a portable fly-trap provided with a drop-door, in combination with cone-shaped entrances, constructed and operated as hereinafter described.

A represents a wooden frame, covered with wire screen, and provided at each end with a cone-shaped entrance, B. The bottom of the frame is provided with a handle, C. D represents a trap-door, hinged to the bottom of the frame, and arranged to open inward, as indicated in Figs. 2 and 3 of the drawings. E is a rubber spring, attached to the bottom of the trap-door and to the frame, as shown in the drawings.

The trap, being held by the handle, with the plane of the bottom at an angle of about forty-five degrees to the plane of a table-top or other surface on which flies are resting or running, as illustrated in Fig. 3 of drawings, is swept over the surface, causing the air to force open the trap-door and gather the flies within the trap, and the door closes quickly by the spring, securing the flies in the trap. The trap is then placed on its bottom, and the proper bait placed within it, which, with the flies already within it, caught as described, attracts other flies through the entrances B. When the trap is sufficiently full, a rapid back-and-forth motion of the trap stuns the flies, which may then be emptied out through the bottom.

What I claim as new, and desire to secure by Letters Patent, is—

1. A portable fly-trap, having a door, D, at the bottom, held by a light spring, E, by which the door, being opened upon a sudden movement of the trap, is closed automatically, substantially as and for the purposes described.

2. In a portable fly-trap, the combination of the door D and the frame A, covered with gauze, and provided with entrances B and handle C, substantially as and for the purposes described.

In testimony that I claim the foregoing as my own I affix my signature in presence of two witnesses.

FERDINAND FRIDRICH THEDENS.

Witnesses:
W. W. SANBORN,
W. C. GROHE.